(12) United States Patent
Kimura et al.

(10) Patent No.: US 8,014,441 B2
(45) Date of Patent: Sep. 6, 2011

(54) COMMUNICATION CHANNEL ESTABLISHING METHOD, COMMUNICATION SYSTEM, AND COMMUNICATION APPARATUS

(75) Inventors: Youichi Kimura, Tama (JP); Katsuhiko Sukegawa, Tama (JP); Hitoshi Hiketa, Tenri (JP); Yohko Seike, Nara (JP)

(73) Assignees: Mitsumi Electric Co., Ltd., Tokyo (JP); Sharp Kabushiki Kaisha, Osaka (JP)

( * ) Notice: Subject to any disclaimer, the term of this patent is extended or adjusted under 35 U.S.C. 154(b) by 691 days.

(21) Appl. No.: 11/731,305

(22) Filed: Mar. 30, 2007

(65) Prior Publication Data
US 2007/0232363 A1    Oct. 4, 2007

(30) Foreign Application Priority Data

Mar. 31, 2006  (JP) ................................. 2006-100426

(51) Int. Cl.
*H04B 1/38* (2006.01)
(52) U.S. Cl. ........................................ 375/220; 375/259
(58) Field of Classification Search .................. 375/219, 375/220, 222, 356–357, 259
See application file for complete search history.

(56) References Cited

U.S. PATENT DOCUMENTS

| | | | | |
|---|---|---|---|---|
| 5,699,276 | A * | 12/1997 | Roos ........................ | 379/106.03 |
| 6,353,747 | B1 * | 3/2002 | Honda ........................ | 455/561 |
| 6,628,207 | B1 * | 9/2003 | Hemminger et al. .... | 340/870.02 |
| 7,504,821 | B2 * | 3/2009 | Shuey ........................ | 324/142 |
| 2002/0119770 | A1 | 8/2002 | Twitchell, Jr. | |
| 2003/0016122 | A1 * | 1/2003 | Petrick ...................... | 340/10.41 |
| 2003/0051080 | A1 | 3/2003 | Mahany et al. | |
| 2003/0233583 | A1 * | 12/2003 | Carley ........................ | 713/201 |
| 2005/0218218 | A1 * | 10/2005 | Koster ........................ | 235/383 |
| 2005/0248456 | A1 | 11/2005 | Britton, Jr. et al. | |
| 2005/0282573 | A1 | 12/2005 | Maeno | |
| 2006/0018284 | A1 * | 1/2006 | Rudolf et al. ................. | 370/332 |
| 2006/0122744 | A1 * | 6/2006 | Hayashi et al. .................... | 701/1 |
| 2008/0039066 | A1 * | 2/2008 | Laroia et al. ............... | 455/422.1 |
| 2009/0040954 | A1 * | 2/2009 | Usuba ........................... | 370/311 |
| 2010/0245120 | A1 * | 9/2010 | Porter et al. .................. | 340/850 |

FOREIGN PATENT DOCUMENTS

EP    1 113 690 A2    7/2001

(Continued)

OTHER PUBLICATIONS

Patent Abstract of Japan of JP 2002-304673 dated Oct. 18, 2002.

(Continued)

*Primary Examiner* — Emmanuel Bayard
(74) *Attorney, Agent, or Firm* — Ladas & Parry LLP

(57) ABSTRACT

A communication channel establishing method is provided that is used in a communication system including a base station that transmits a beacon on a predetermined communication channel and a communication apparatus that receives the beacon from the base station and establishes communication with the base station using the predetermined communication channel. The method involves detecting at the base station whether a main power supply has been shut off, driving the base station by a backup power supply and transmitting a power supply shutoff notification signal from the base station to the communication apparatus upon detecting that the main power supply has been shut off, storing a current communication channel of the communication apparatus when the power supply shutoff notification signal from the base station is received by the communication unit, and reestablishing communication with the base station at the communication apparatus using the stored current communication channel upon recovery of the main power supply.

6 Claims, 6 Drawing Sheets

FOREIGN PATENT DOCUMENTS

| | | |
|---|---|---|
| JP | 04-037324 A | 2/1992 |
| JP | 07-254872 A | 10/1995 |
| JP | 09-138892 | 5/1997 |
| JP | 11-219148 | 8/1999 |
| JP | 2002-109177 | 4/2002 |
| JP | 2002-304673 | 10/2002 |
| JP | 2003-179981 A | 6/2003 |
| JP | 2004-265196 | 9/2004 |
| JP | 2005-099888 | 4/2005 |
| JP | 2006-005577 A | 1/2006 |
| JP | 2006-033415 A | 2/2006 |

OTHER PUBLICATIONS

Patent Abstract of Japan of JP 2005-099888 dated Apr. 14, 2005.
Patent Abstract of Japan of JP 2002-109177 dated Apr. 12, 2002.
Patent Abstract of Japan of JP 2004-265196 dated Sep. 24, 2004.
Patent Abstract of Japan of JP 09-138892 dated May 27, 1997.
Patent Abstract of Japan of JP 11-219148 dated Aug. 10, 1999.
Office Action mailed on Feb. 8, 2011 in connection with the basic Japanese patent application No. 2006-100426.
Patent Abstracts of Japan English abstract of JP 2006-005577 A.
Patent Abstracts of Japan English abstract of JP 2003-179981 A.
Patent Abstracts of Japan English abstract of JP 2006-033415 A.
Patent Abstracts of Japan English abstract of JP 07-254872 A.
Patent Abstracts of Japan English abstract of JP 04-037324 A.
English translation of Office Action mailed on Feb. 8, 2011 in connection with the basic Japanese patent application No. 2006-100426.

* cited by examiner

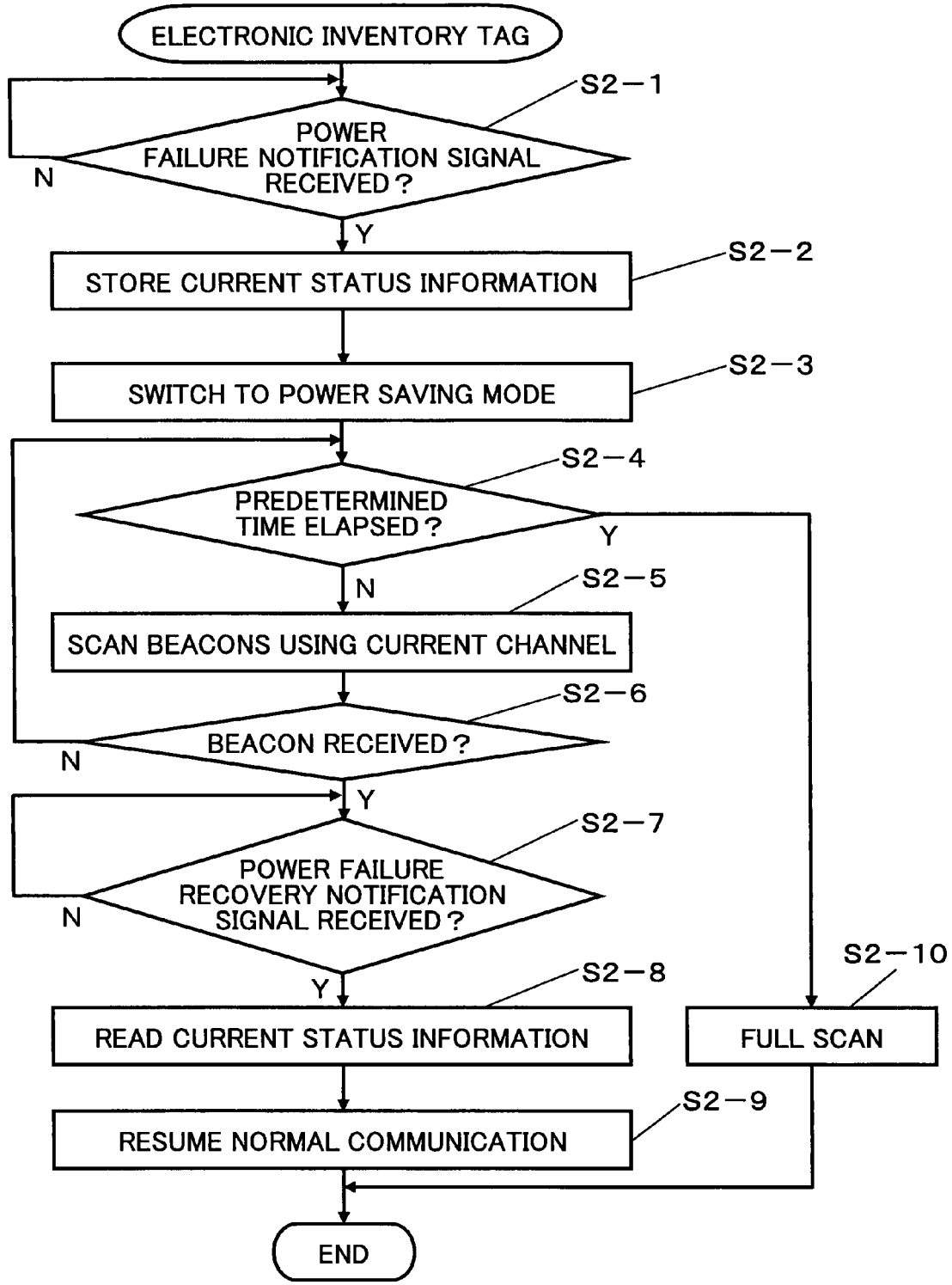

COMMUNICATION CHANNEL ESTABLISHING METHOD, COMMUNICATION SYSTEM, AND COMMUNICATION APPARATUS

BACKGROUND OF THE INVENTION

1. Field of the Invention

The present invention relates to a communication channel establishing method that involves searching beacons transmitted from a base station, receiving a beacon according to the search result, and establishing a communication channel with the base station based on the received beacon; a communication system using such a method; and a communication apparatus.

2. Description of the Related Art

In an electronic inventory tag system, electronic inventory tags having rewritable display information are registered in a host computer to then be placed on product shelves, and the host computer may access the electronic inventory tags via an access point to rewrite the display information of the electronic inventory tags at the host computer side (e.g. see Japanese Laid-Open Patent Publications No. 2002-304673, No. 2005-99888, No. 2002-109177, No. 2004-265196, and No. 9-138892).

In such an electronic inventory tag system, a communication system is used that determines a communication channel for establishing communication between an electronic inventory tag and an access point using a beacon. In the case where the communication system using a beacon is implemented, an electronic inventory tag scans all available communication channels to determine the communication channel to be established with an access point.

However, according to such a communication method, once communication between a coordinator and a node is shut off, the node has to search all communication channels to reestablish the communication channel with the coordinator. In this case, when the coordinator is unable to establish communication due to power failure, for example, the node may keep on searching all communication channels even though a communication counterpart cannot be accessed and power may needlessly be consumed. Also, even when the coordinator recovers from power failure, a long recovery time may be needed to reestablish the communication channel since the node has to search all communication channels.

It is noted that in the electronic inventory tag system, the electronic tags corresponding to nodes are driven by batteries, and therefore, measures for reducing the power consumption of the electronic inventory tags are in demand.

SUMMARY OF THE INVENTION

According to one aspect of the present invention, a communication establishing method, a communication system, and a communication apparatus are provided for reducing power consumption and enabling high speed communication recovery.

According to an embodiment of the present invention, a communication channel establishing method is provided that is used in a communication system including a base station that transmits a beacon on a predetermined communication channel and a communication apparatus that receives the beacon from the base station and establishes communication with the base station using the predetermined communication channel, the method including the steps of:

detecting at the base station whether a main power supply has been shut off;

driving the base station by a backup power supply and transmitting a power supply shutoff notification signal from the base station to the communication apparatus upon detecting that the main power supply has been shut off;

storing a current communication channel of the communication apparatus when the power supply shutoff notification signal from the base station is received by the communication unit; and reestablishing communication with the base station at the communication apparatus using the stored current communication channel upon recovery of the main power supply.

In one preferred embodiment of the present invention, the communication apparatus may store current status information upon receiving the main power supply shutoff notification signal from the base station.

In another preferred embodiment of the present invention, the communication apparatus may intermittently perform communication channel search after receiving the main power supply shutoff notification signal from the base station.

In another preferred embodiment of the present invention, the base station may transmit a main power supply recovery notification signal to the communication apparatus when the main power supply is turned on after being shut off; and the communication apparatus may receive the main power supply recovery notification signal from the base station and reestablish communication with the base station using the stored current communication channel.

According to another embodiment of the present invention, a communication system is provided that includes:

a base station that transmits a beacon on a predetermined communication channel; and a communication apparatus that receives the beacon from the base station and establishes communication with the base station using the predetermined communication channel; wherein the base station detects whether a main power supply has been shut off, receives drive power from a backup power supply when the main power supply is shut off, and transmits a main power shutoff notification signal to the communication apparatus; and the communication apparatus stores a current communication channel upon receiving the main power shutoff notification signal from the base station, and reestablishes communication with the base station using the stored current communication channel upon recovery of the main power supply.

According to another embodiment of the present invention, a communication apparatus is provided that receives a beacon from a base station and establishes communication using a communication channel according to the received beacon, the apparatus including:

a communications unit that establishes communication with the base station; and a control unit that stores a current communication channel upon receiving a main power supply shutoff notification signal from the base station via the communications unit, and searches subsequent beacons transmitted from the base station using the stored current communication channel.

BRIEF DESCRIPTION OF THE DRAWINGS

FIG. 6 is a flowchart illustrating operations of the electronic inventory tag.

DETAILED DESCRIPTION OF THE PREFERRED EMBODIMENTS

In the following, preferred embodiments of the present invention are described with reference to the accompanying drawings.

[System Configuration]

Figure 1:
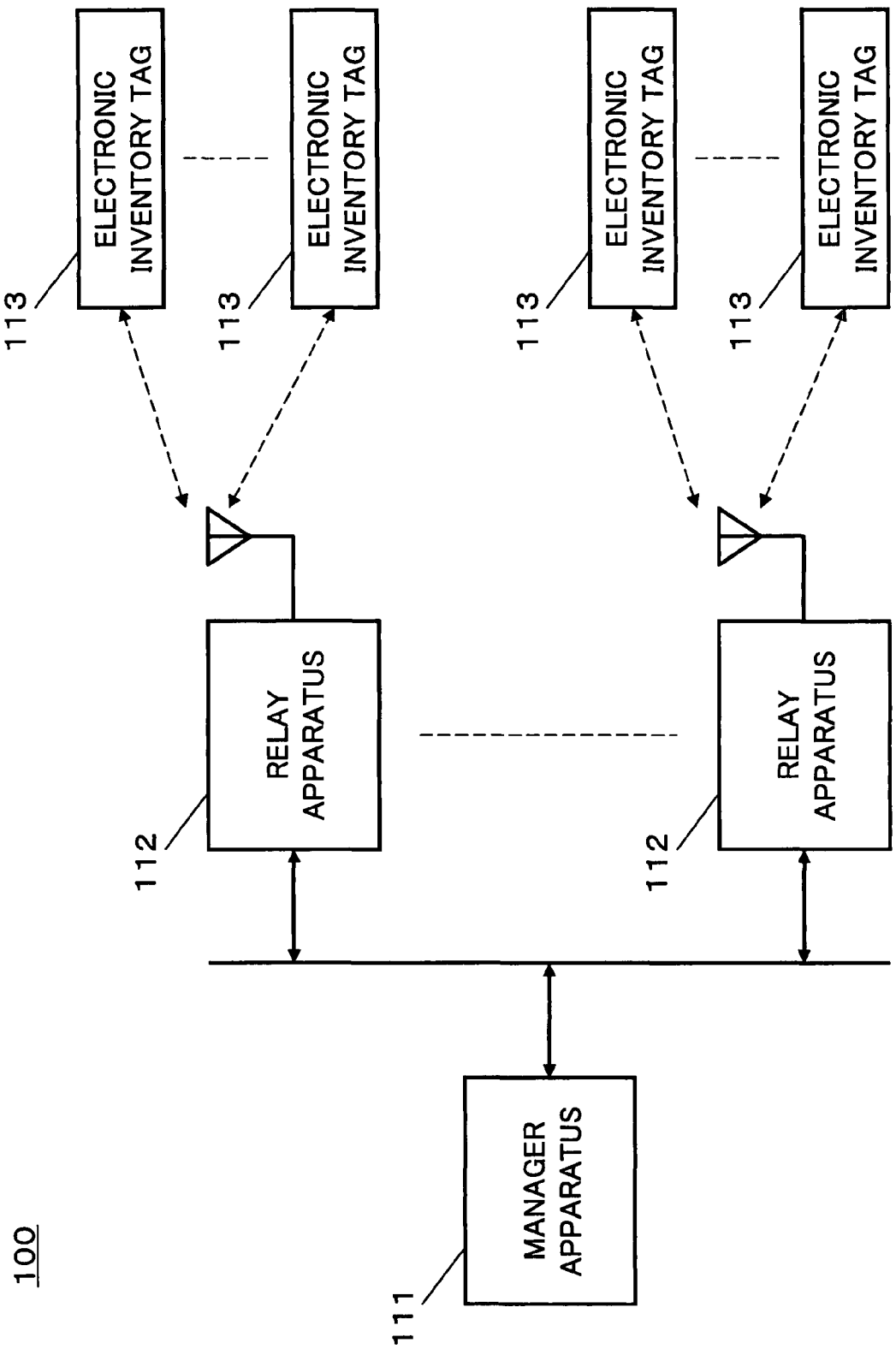
FIG. 1 is a block diagram illustrating a configuration of an electronic inventory tag system according to an embodiment of the present invention.

FIG. 1 is a block diagram showing a configuration of an electronic inventory tag system according to an embodiment of the present invention.

The electronic inventory tag system 100 according to the present embodiment includes a manager apparatus 111, relay apparatuses 112, and electronic inventory tags 113. The electronic inventory tag system 100 manages the electronic inventory tags 113 placed on product shelves using the relay apparatuses 112 that relay communication between the electronic inventory tags 113 and the manager apparatus 111.

[Relay Apparatus]

Figure 2:
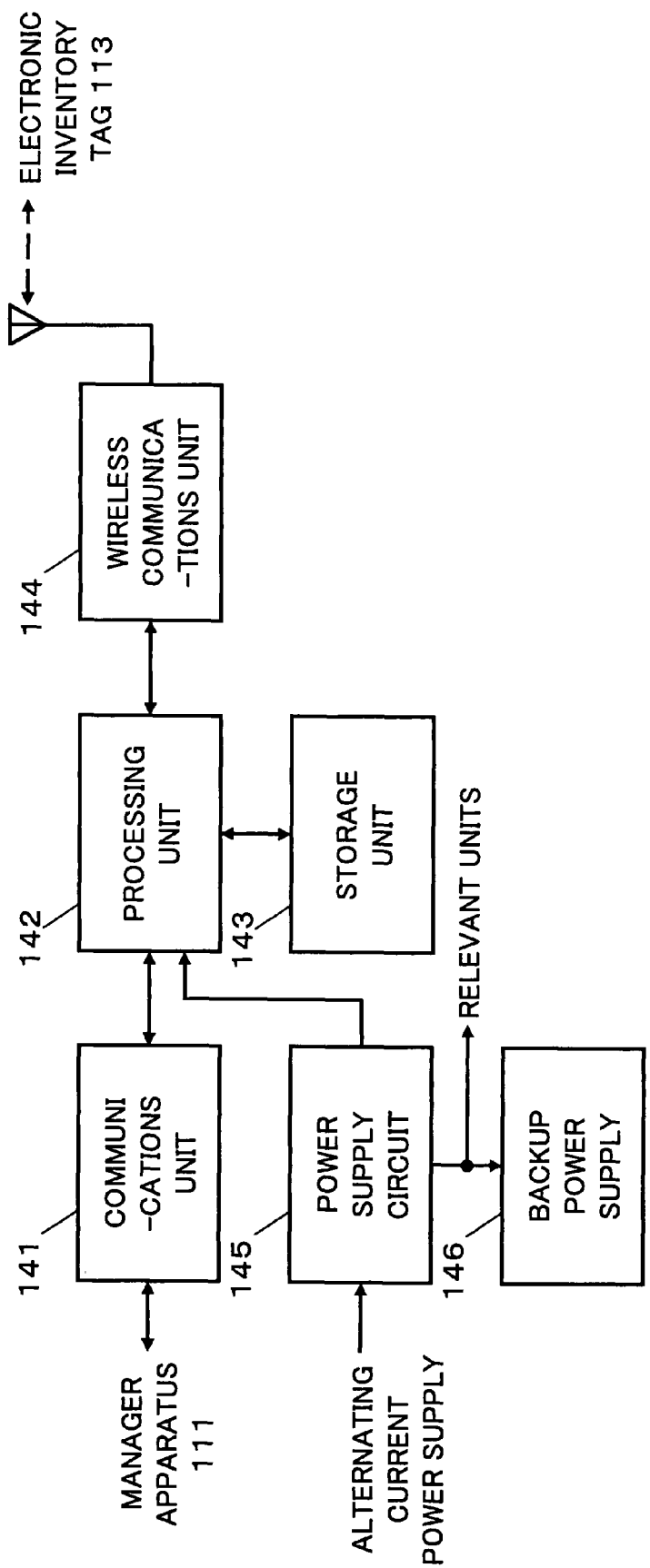
FIG. 2 is a block diagram showing a configuration of a relay apparatus.

FIG. 2 is a block diagram showing a configuration of the relay apparatus 112.

The relay apparatus 112 includes a communications unit 141, a processing unit 142, a storage unit 143, a wireless communications unit 144, a power supply circuit 145, and a backup power supply 146.

The communications unit 141 is connected to the manager apparatus 111 via a network such as a LAN, a WAN, or a dedicated line to establish communication with the manager apparatus 111.

The processing unit 142 may include a microcomputer, for example, and performs processes such as relaying communications between the manager apparatus 111 and the electronic inventory tags 113 based on programs installed in the storage unit 143.

The storage unit 143 may include a ROM, a RAM, and a rewritable nonvolatile memory such as an EEPROM, for example, to store communication control programs and communicable electronic inventory tag information.

The wireless communications unit 144 establishes wireless communication with the electronic inventory tags 113.

The power supply circuit 145 is connected to an external alternating current power supply such as a commercial power supply, converts the alternating current into a direct current voltage, and supplies the direct current voltage as a drive voltage to the communications unit 141, the processing unit 142, the storage unit 143, and the wireless communications unit 144. When the alternating current power supply corresponding to a main power supply is shut off, the power supply circuit 145 transmits a signal to the processing unit 142 indicating that the main power supply has been shut off, and when the alternating current power supply corresponding to the main power supply is turned on, the power supply circuit 145 transmits a signal to the processing unit 142 indicating that the main power supply has been turned on.

The backup power supply 146 is a rechargeable battery such as a Ni—Cd battery, a lithium ion battery, or an electric dual layer capacitor that is charged by the direct current voltage generated by the power supply circuit 145. The backup power supply 146 supplies drive power to the communications unit 141, the processing unit 142, the storage unit 143, and the wireless communications unit 144 for a predetermined period of time so that termination programs may be properly executed when the alternating current power supply is shut off.

[Electronic Inventory Tag]

Figure 3:
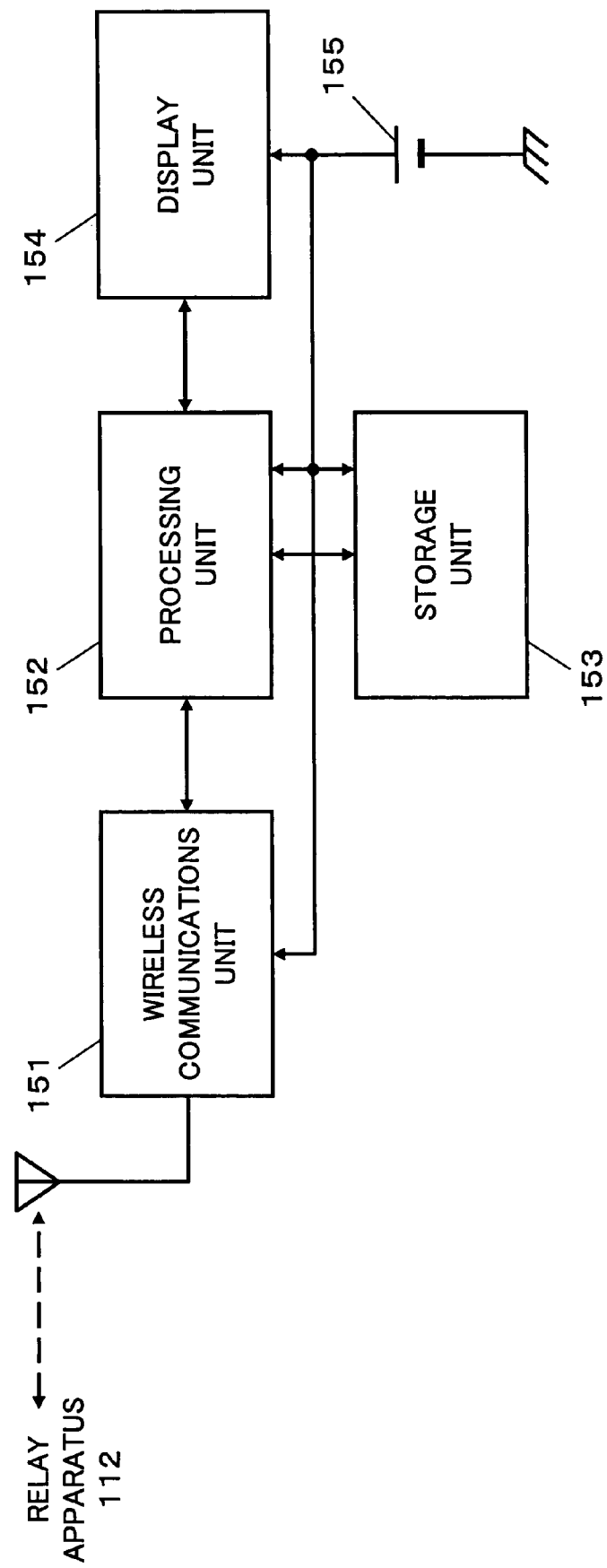
FIG. 3 is a block diagram showing configuration of an electronic inventory tag.

FIG. 3 is a block diagram showing a configuration of the electronic inventory tag 113.

The electronic inventory tag 113 includes a wireless communications unit 151, a processing unit 152, a storage unit 153, a display unit 154, and a battery 155.

The wireless communications unit 151 establishes communication with the relay apparatus 112. It is noted that communication channel control of the wireless communications unit 151 may be performed based on instructions from the processing unit 152.

The processing unit 152 may include a CPU, for example, and is configured to control communications with the relay apparatus 112 and display operations of the display unit 154 based on programs stored in the storage unit 153.

The storage unit 153 may include a rewritable nonvolatile storage device such as an EEPROM that stores programs to be executed by the processing unit 152 as well as inventory tag ID and product code. A part of the inventory tag ID and the product code may be registered beforehand and changed by the relay apparatus 112.

The display unit 154 may include a LCD, an EL panel, or electronic paper, for example, and is configured to display information such as product name, product code, and price according to instructions from the processing unit 152.

The battery 155 is a miniature battery that supplies drive power to the wireless communications unit 151, the processing unit 152, the storage unit 153, and the display unit 154.

[Communication Data]

In the following, communication data that are exchanged between the relay apparatus 112 and the electronic inventory tag 113 are described.

Figure 4:
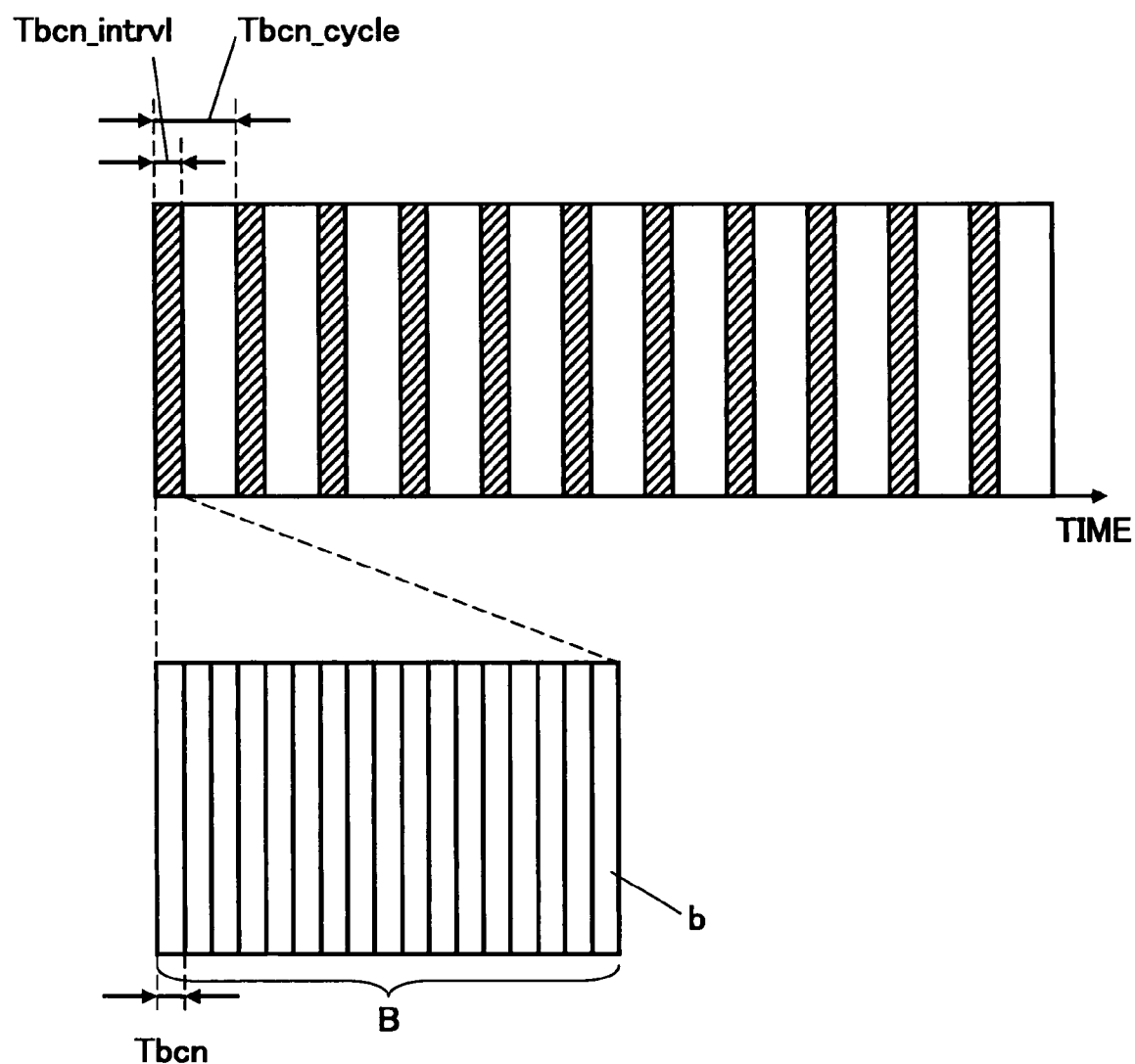
FIG. 4 is a diagram illustrating a transmission pattern of beacons transmitted from the relay apparatus.

FIG. 4 is a diagram illustrating a transmission pattern of beacons transmitted from the relay apparatus 112.

The relay apparatus 112 periodically transmits a beacon group B including plural beacons b at beacon transmission cycles of Tbcn_cycl milliseconds. Provided that the transmission time period for transmitting the beacon group B is denoted as Tbn_intrvl milliseconds, the relationship between the beacon transmission cycle Tbcn_cycl and the beacon group transmission time period Tbn_intrvl may expressed as follows:

$$Tbn\_intrvl < Tbcn\_cycl$$

Also, provided that the number of beacons b included in the bacon group B is denoted as N and the transmission time period for transmitting each beacon b is denoted as Tbcn milliseconds, the beacon group transmission time period Tbcn_intrvl may be expressed as follows:

$$Tbcn\_intrvl = N \times Tbcn$$

In the present embodiment, the transmission time period Tbcn for transmitting each beacon b is set to the time required for the electronic inventory tag 113 to receive the beacon b.

The relay apparatus 112 may transmit a beacon b to the electronic inventory tag 113 every two seconds, for example, to inform the electronic inventory tag apparatus 113 of the current communication status. It is noted that the time period between two beacon transmissions is referred to as frame. A frame corresponds to a basic communication unit for communication between the relay apparatus 112 and the electronic inventory tag 113. A beacon includes call information such as an identification number of the electronic inventory tag 113 with which communication is to be established in the frame following this beacon.

A frame may be subdivided into sixteen periods, for example, and each of the subdivided periods (125 millisecond periods) is referred to as a data slot.

A time period for transmitting a beacon is assigned at the head of a frame. Thus, the head of the first data slot of a frame corresponds to a time period for transmitting a beacon.

The second to fifteenth data slots of the frame may also have similar configurations. However, the type of data to be transmitted in the second to fifteenth data slots is different from that transmitted in the first data slot. Specifically, a message referred to as null beacon, which has a function different from that of a beacon, is transmitted at the head of each of the second to fifteenth data slots.

In one embodiment, the relay apparatus 112 may transmit a beacon every two seconds, and transmit a null beacon every 125 milliseconds after transmission of a beacon. The transmission of the null beacon at 125-millisecond intervals may continue until a next beacon is transmitted.

In this case, periods for transmitting a beacon once and a null beacon fifteen times are included in one frame. It is noted that a beacon and a null beacon have different functions as is described below.

Normally, a beacon has a function for calling the electronic inventory tag 113 and contains call information such as the identification number of the relevant electronic inventory tag 113.

On the other hand, a null beacon is used when the electronic inventory tag 113 conducts channel search for accessing the relay apparatus 112. In the present embodiment, the electronic inventory tag 113 does not use the null beacon for purposes other than channel search.

The null beacon may include a temporal offset value with respect to the beacon transmission period. In this way, the timing of the beacon transmission period may be determined when at least one null beacon is obtained, for example.

[Operations]

In the following, operations of the communication system according to an embodiment of the present invention are described.

Figure 5:
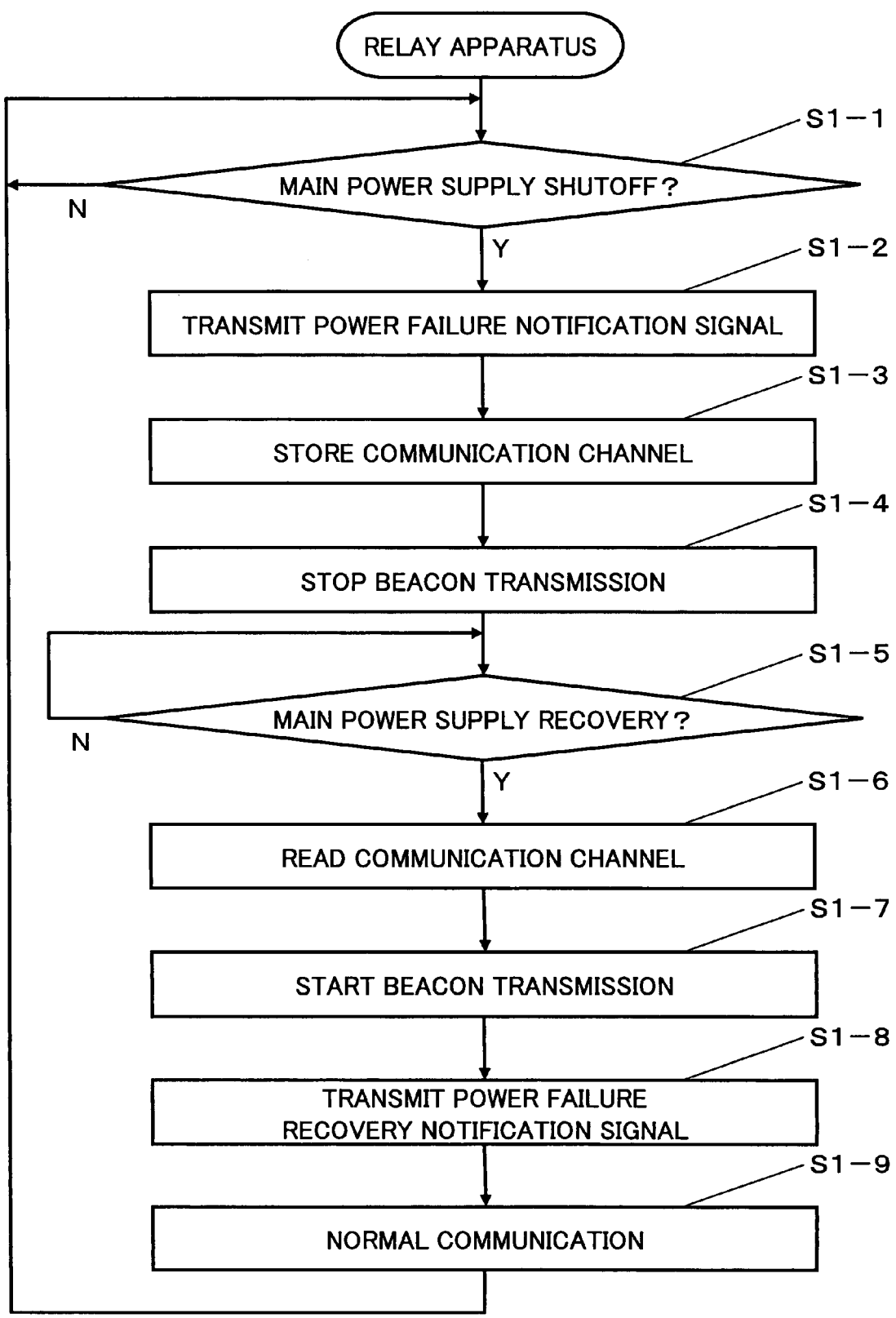
FIG. 5 is a flowchart illustrating operations of the relay apparatus.

FIG. 5 is a flowchart illustrating operations of the relay apparatus 112.

Upon receiving a notification signal from the power supply circuit 145 indicating that the alternating current power supply corresponding to the main power supply has been shut off (step S1-1), the processing unit 142 of the relay apparatus 112 generates a power failure notification signal (main power shutoff notification signal) and transmits the generated signal to the electronic inventory tag 113 via the wireless communications unit 144 (step S1-2).

Also, the processing unit 142 stores the communication channel established at the time the power failure notification signal is generated in the storage unit 143 (step S1-3), and stops beacon transmission (step S1-4).

Upon determining based on a notification signal transmitted from the power supply circuit 145 that the alternating current power supply corresponding to the main power supply has been turned on again, the processing unit 142 reads the communication channel stored in the storage unit 143 (step S1-6), starts beacon transmission using the read communication channel (step S1-7), and transmits a power failure recovery notification signal (power failure recovery notification signal) to the electronic inventory tag 113 (step S1-8). By transmitting the power failure recovery notification signal, the relay apparatus 112 may restore communication with the electronic inventory tag 113 to the communication status right before the shutoff of the main power supply and communication with the electronic inventory tag 113 may be established using the same communication channel used before the shutoff of the main power supply.

In this way, the processing unit 142 may resume normal communication operations (step S1-9).

In the following, operations of the electronic inventory tag 113 are described.

FIG. 6 is a flowchart illustrating operations of the electronic inventory tag 113.

Upon receiving a power failure notification signal from the relay apparatus 112 (step S2-1), the processing unit 152 of the electronic inventory tag 113 stores current status information including the current communication channel in the storage unit 153 (step S2-2), and switches to power saving mode in which communication channel search is performed intermittently (step S2-3).

Then, upon determining that the elapsed time is still within a predetermined time (step S2-4), the processing unit 152 of the electronic inventory tag 113 scans beacons transmitted from the relay apparatus 112 using the current communication channel stored in the storage unit 153 (step S2-5). Then, upon receiving a beacon as a result of scanning the beacons using the current communication channel (step S2-6) and receiving a power failure recovery notification signal from the relay apparatus 112 (step S2-7), the processing unit 152 reads the current status information such as identification number and product code stored in the storage unit 153 (step S2-8), and resumes normal communication with the relay apparatus 112 (step S2-9).

On the other hand, upon determining that the predetermined time has already elapsed in step S2-4, the processing unit 152 of the electronic inventory tag 113 presumes that it has moved to a communication area of a different relay apparatus 112 and switches to full scan mode for searching all communication channels (step S2-10).

According to the present embodiment, when the main power supply of the relay apparatus 112 is shut off due to power failure, for example, the electronic inventory tag 113 is notified of the power failure by the relay apparatus 112 and the communication channel established at the time of the notification is stored before the electronic inventory tag 113 switches to power saving mode. Thus, the electronic inventory tag 113 may not have to scan all communication channels upon reestablishing communication with the relay apparatus 112 to thereby limit unnecessary channel scanning and reduce power consumption of the electronic inventory tag 113.

Also, upon power failure recovery, the electronic inventory tag 113 may reestablish communication with the relay apparatus 112 using the stored communication channel so that high speed recovery may be possible.

It is noted that in the above descriptions, communication between a relay apparatus 112 and an electronic inventory tag 113 of an electronic inventory tag system 100 is illustrated as an exemplary embodiment of the present invention. However, the present invention is not limited to such an embodiment, and may be applied to any communication system having a base station that transmits a beacon on a predetermined communication channel and a communication apparatus that receives the beacon from the base station and establishes communication using the predetermined communication channel.

Further, it is noted that the present invention is not limited to the specific embodiments described above, and variations and modifications may be made without departing from the scope of the present invention.

The present application is based on and claims the benefit of the earlier filing date of Japanese Patent Application No. 2006-100426 filed on Mar. 31, 2006, the entire contents of which are hereby incorporated by reference.

What is claimed is:

1. A communication channel establishing method used in a communication system including a base station that transmits a beacon on a predetermined communication channel and an electronic inventory tag including a communication unit that receives the beacon from the base station and establishes communication with the base station using the predetermined communication channel, the method comprising the steps of:
    detecting at the base station whether a main power supply to supply power to the base station has been shut off;
    driving the base station by a backup power supply and transmitting a power supply shutoff notification signal from the base station to the electronic inventory tag by wireless communication upon detecting that the main power supply has been shut off;
    storing a current communication channel of the electronic inventory tag when the power supply shutoff notification signal from the base station is received by the communication unit, the electronic inventory tag including a display unit to display information about products and being driven by a battery; and
    reestablishing wireless communication with the base station the electronic inventory tag using the stored current communication channel upon recovery of the main power supply,
    wherein the beacon includes an identification number of the electronic inventory to with which the wireless communication is to be established, and
    wherein the base station transmits the beacon periodically at a head of a frame, the frame including the beacon and a null beacon, the null beacon having a function different from the beacon.

2. The communication channel establishing method as claimed in claim 1, wherein
    the communication apparatus stores current status information upon receiving the main power supply shutoff notification signal from the base station.

3. The communication channel establishing method as claimed in claim 1, wherein
    the communication apparatus intermittently performs communication channel search for searching all communication channels, after receiving the main power supply shutoff notification signal from the base station by using the null beacon for accessing the base station.

4. The communication channel establishing method as claimed in claim 1, wherein
    the base station transmits a main power supply recovery notification signal to the communication apparatus when the main power supply is turned on after being shut off; and
    the communication apparatus receives the main power supply recovery notification signal from the base station and reestablishes communication with the base station using the stored current communication channel.

5. A communication system comprising:
    a base station that transmits a beacon on a predetermined communication channel; and
    an electronic inventory tag including a communication unit that receives the beacon from the base station and establishes communication with the base station using the predetermined communication channel; wherein
    the base station detects whether a main power supply to supply power to the base station has been shut off, receives drive power from a backup power supply when the main power supply is shut off, and transmits a main power shutoff notification signal to the electronic inventory tag by wireless communication;
    the electronic inventory tag stores a current communication channel upon receiving the main power shutoff notification signal from the base station, the electronic inventory tag including a display unit to display information about products and being driven by a battery, and reestablishes wireless communication with the base station using the stored current communication channel upon recovery of the main power supply;
    the beacon includes an identification number of the electronic inventory tag with which the wireless communication is to be established; and
    the base station transmits the beacon periodically at a head of a frame, the frame including the beacon and a null beacon, the null beacon having a function different from the beacon.

6. An electronic inventory tag including a communications unit that receives a beacon from a base station and establishes communication using a communication channel according to the received beacon, the electronic inventory tag comprising:
    said communications unit that establishes wireless communication with the base station; and
    a control unit that stores a current communication channel of the electronic inventory tag upon receiving a main power supply shutoff notification signal indicating that a main power supply to supply power to the base station has been shut off from the base station via the communications unit, and searches subsequent beacons transmitted from the base station using the stored current communication channel,
    wherein the electronic inventory tag includes a display unit to display information about products and being driven by a battery,
    wherein the beacon includes an identification number of the electronic inventory tag with which the wireless communication is to be established, and
    wherein the base station transmits the beacon periodically at a head of a frame, the frame including the beacon and a null beacon, the null beacon having a function different from the beacon.

* * * * *